UNITED STATES PATENT OFFICE.

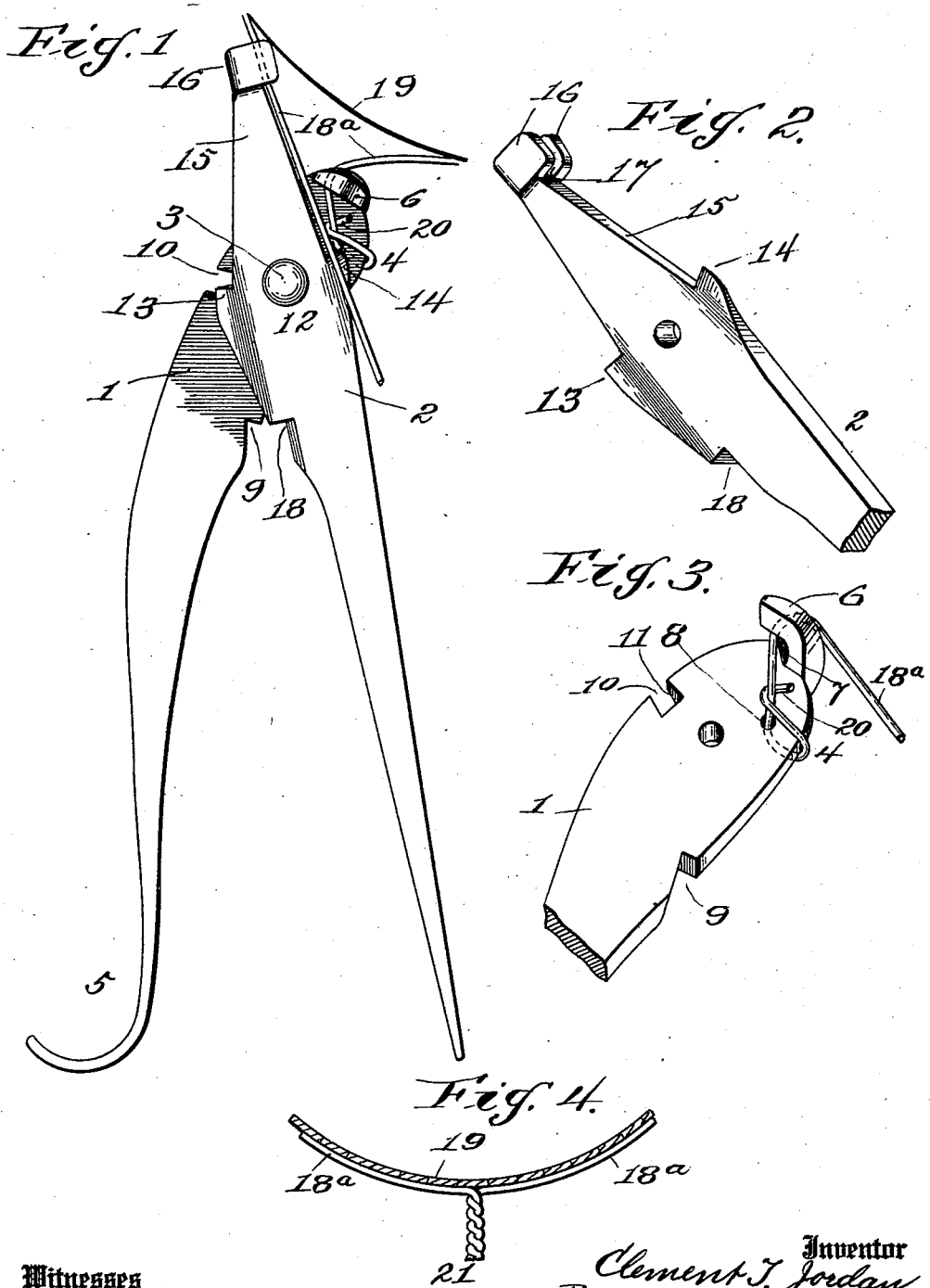

CLEMENT T. JORDAN, OF SALITPA, ALABAMA.

WIRE-TOOL.

1,011,806.

Specification of Letters Patent.

Patented Dec. 12, 1911.

Application filed December 9, 1910. Serial No. 596,474.

*To all whom it may concern:*

Be it known that I, CLEMENT T. JORDAN, a citizen of the United States, residing at Salitpa, in the county of Clarke and State of Alabama, have invented certain new and useful Improvements in Wire-Tools, of which the following is a specification.

This invention relates to wire working tools and especially to a tool for holding, stretching or tightening, twisting and cutting wire.

The object of the invention is to provide a wire working tool having a plurality of cutters therein, and of such construction and arrangement as to afford unusual leverage in working the wire.

A still further object of the invention is to provide a wire working tool composed of two members or levers pivoted together so as to afford unusual leverage, one of said members having a cutter hole formed therein and the other of said members having a pair of cutters formed therein, one of which coöperates with said cutter hole.

Various other objects, advantages, and improved results are attainable in the manipulation of wire by my improved tool.

In the accompanying drawings forming a part of this application: Figure 1 is a side elevation of my improved wire working tool showing its application. Fig. 2 is a perspective view of one of the levers partly broken away. Fig. 3 is a perspective view of the other lever partly broken away, showing one end of a wire fastened thereto. Fig. 4 is a detail view showing the result of the operation of the tool.

The same reference numerals denote the same parts throughout the several views of the drawings.

The tool comprises two levers or members 1 and 2, and a nut and bolt, or rivet 3, for pivotally connecting the levers. The lever or member 1, has a curved hand grasping portion 5, for working the members in pivot movement and for operating the tool as hereinafter fully described. The pivot end of the lever member 1, has a head 6, projecting therefrom at right angles to the inner face thereof, and said head is provided with a slot 7, adjacent the inner face of the said member 1. The pivot end of the member 1, has an aperture or wire hole 8, near one edge thereof and between the said head and the pivot 3, and this edge of the lever has a notch 9, provided with a cutting edge; the other edge of the member 1, has a slot 10, provided with a cutting edge 11.

The member 2, has an arrow-shaped head 12, comprising wire cutting wings 13, and 14, from which an arm 15, is projected, and the end of this arm is provided with a pair of flanges 16, projecting from one edge of the arm 15, with an interval or space 17, between the flanges. The edge of the member 2, has a notch 18, provided with a cutting edge adapted to coöperate with the cutting edge of the notch 9, of the member 1. The cutting wings 13 and 14, are diametrically opposite the pivot 3, and the position of the wings with respect to the hole 8, and to the slot 10, is such as to have the wing 14, coöperate with the hole 8, in a wire cutting operation, and as to have the wing 13, coöperate with the slot 10 in a wire cutting operation. Said operations are separate and independent of each other by reason of the fact that the first mentioned operation for cutting is accomplished by opening the two members, and the other cutting operation is accomplished by closing said members. The cutting operation of the notches 9 and 18, is produced by closing the members. The arm 15, works in the slot 7, of the head 6, so as to stop the inward pivot movement of the levers and for the purpose of grasping or clamping a wire $18^a$ extending through the interval or space 17, between the head 6, and the edge of the arm 15.

In operating a wire for baling or binding packages, boxes, or (for example, a barrel 19,) one end 20, of the wire $18^a$, is inserted through the hole 8, from the inner side of the member 1, having the head 6, projecting therefrom, and this end of the wire is looped at 4, by being bent over the edge of the member 1, and half way around the wire adjacent the hole 8, the wire is placed in the head slot 7, whence it is extended around the barrel and through the end flanges 16, of the member 2, and through the head slot 7, of the member 1, where the two portions of the wire are clamped (with the tool perpendicular to the barrel) between the head 6, and the arm 15, by closing the members. The head 12, is worked (with the wire in said position) against the barrel to fulcrum the tool in its leverage movement, and during such movement the members are given sufficient pivot movement to stretch and tighten the wire preparatory to twisting the said wire portions together, then the tool is turned to vertical position or parallel with the barrel and revolved sufficiently to form the wire twist 21, after which the members are opened so as to cut the wire end 20, flush with the hole 8, whence it is readily removed; and the other cutters are to be used for trimming and shaping the twist 21, as desired. After the wire is hooked through the hole 8, and placed around an object to be baled and the wire is caught in the head 12, it will be observed that the working of the tool will complete the baling, twisting and cutting.

I do not wish to be understood as confining myself to any particular material, size or means for pivoting the tool, nor to any special application of the same, but reserve to myself the right to make such variations in the manufacture of the tool as may be found expedient under the scope of the appended claims.

Having thus described my invention what I claim as new and desire to secure by Letters Patent is:

1. A wire working tool comprising a pair of levers pivoted together, one of such levers having an aperture for fastening one end of a wire to this member, a head formed on this lever, the other of said members having a cutter coöperating with the aperture in a wire cutting operation, this lever having an arm projecting beyond said head and coöperating with the latter in clamping the wire for stretching and twisting, and a wire guide on the end of the arm and forming a fulcrum for the tool during the stretching.

2. A wire working tool comprising a pair of levers pivoted together, one of such members having a wire cutting notch, and an aperture therein for holding one end of the wire during its stretching, and a clamping head on this lever, the other of said levers having a pair of cutters diametrically opposite each other, one of said cutters coöperating with the aperture and the other of said cutters coöperating with the notch in the apertured lever, a clamping arm projecting from the pair of cutters and coöperating with the clamping head, and a wire fulcrum guide on the end of said arm.

In testimony whereof I affix my signature, in the presence of two witnesses.

CLEMENT T. JORDAN.

Witnesses:
E. P. WILSON,
IRMA CALHOUN.

---

Copies of this patent may be obtained for five cents each, by addressing the "Commissioner of Patents, Washington, D. C."